United States Patent [19]

Brown

[11] 4,079,861

[45] Mar. 21, 1978

[54] FLUIDS MIXING AND PROPORTIONING DEVICE

[76] Inventor: Merritt James Brown, 813 Hastings Dr., Kissimmee, Fla. 32741

[21] Appl. No.: 669,262

[22] Filed: Mar. 22, 1976

[51] Int. Cl.$^2$ .......................... B67D 5/46; B67D 5/56
[52] U.S. Cl. ................................... 222/135; 222/137; 222/333; 222/340
[58] Field of Search ..................... 222/135, 134, 129.2, 222/129.4, 137, 333, 340

[56] References Cited

U.S. PATENT DOCUMENTS

| 3,496,970 | 2/1970 | Pontigney | 222/135 X |
| 3,908,866 | 9/1975 | Brown | 222/135 |

*Primary Examiner*—Robert B. Reeves
*Assistant Examiner*—Frederick R. Handren
*Attorney, Agent, or Firm*—Roger L. Martin

[57] ABSTRACT

A piston type fluids mixing and proportioning device has a chamber where the fluid displacing piston is driven during one of its strokes through a fluid drive coupling, which is established in another chamber that has a driven piston element for displacing fluid received in the chamber and which is equipped with a passageway for delivering the coupling forming fluid to and from the chamber. The piston passageway moves relative to intake and discharge passageways for the coupling forming fluid. Both pistons are spring biased for movement during one stroke and the driven piston element is driven during its other stroke by a driven cam mechanism that has a predetermined period of cyclic operation along with components that engage and disengage the element in a manner that permits the piston element to be locked in a fixed position when the fluids in the chambers are being displaced. A compact valve mechanism is also disclosed for opening and closing intake and discharge passageways as well as to open and close outlet passageways from a chamber for mixing the displaced fluids.

8 Claims, 10 Drawing Figures

FLUIDS MIXING AND PROPORTIONING DEVICE

BACKGROUND OF THE INVENTION

This invention relates to an improved fluids mixing and proportioning device that is designed to mix fluids in predetermined proportions and thereafter dispense the mixture.

Devices for mixing fluids in predetermined proportions that involve the use of a piston which operates in a piston chamber are known. Such devices rely on the piston displacement during its reciprocating movement to take in predetermined quantities of fluid and thereafter dispense the fluid to a mixing chamber or suitable region in which the fluid is mixed with another fluid that is similarly measured in yet another piston chamber. The piston drive arrangement for the two fluid measuring chambers in such cases is usually mechanically coupled so that the piston movements are synchronized. In some of the prior art situations, a single piston is involved in measuring and dispensing the two fluids and in some situations, the fluids are measured and dispensed at opposite ends of one piston chamber.

The inventor's U.S. Pat. No. 3,908,866 shows an arrangement where fluid delivered to one piston chamber is used to establish a fluid drive coupling with the piston used to displace another fluid in yet another chamber, and the current invention relates to improvements in fluid mixing and proportioning devices that utilize some of the principles advocated in the aforementioned patent.

BRIEF SUMMARY OF THE INVENTION

The current invention contemplates the establishment of a fluid drive coupling in a piston chamber for receiving and dispensing a first fluid in amounts that are proportional to that of a second fluid which is received and dispensed from a second chamber which is also equipped with a piston but which is driven by means that involve the fluid drive coupling in the other chamber.

In accord with certain aspects of the invention, the fluid providing the drive coupling is delivered to and from the chamber in which the drive coupling is established through a reciprocating element or piston member which serves to displace the drive coupling forming fluid during the operation of the device. The piston forming member or element for delivering the drive coupling fluid is mounted for movement with respect to intake and discharge passageways for the coupling forming fluid, and these passageways are so arranged in their relationship to the passageway means of the reciprocating element that they communicate with each other through the passageway in the reciprocating element in a manner that avoids initial formation of a partial vacuum in the chamber at the commencement of the fluid intake stroke of the element.

The reciprocating element is locked in a fixed position as the drive coupling forming fluid is dispensed from its chamber and in accord with certain aspects of the invention, the mechanism for reciprocating driving the element utilizes a driven means which operates cyclically in accord with a predetermined period of operation but avoids a mechanical linkage that ties all movements of the element to the cyclic movement of the driven means.

Other aspects of the invention have to do with a novel valve mechanism for controlling fluid delivery to and from the chamber that houses the piston which is driven through the fluid drive coupling, as will be more apparent from disclosure which follows hereinafter.

A general object of the invention is to provide an improved fluids proportioning and mixing device of the kind involving the establishment of the fluid drive coupling in one chamber for purposes of driving a piston in yet another chamber. One particular object is to provide a simple and inexpensive arrangement for delivering the drive coupling forming fluid to and from the chamber in which the drive coupling is established and devices of the kind contemplated herein. Yet another objective is to provide in the environment contemplated an improved drive mechanism for a reciprocating driven member which during its cycle of operation is temporarily locked in a fixed position and which utilizes a power source having a predetermined period of cyclic operation. Yet another objective is to provide simple and effective valving arrangements for controlling the passage of fluid to and from a piston chamber and in accord with movements of a reciprocating member used to drive the piston during one of its strokes but which is temporarily locked in a fixed position during the other of the piston strokes.

BRIEF DESCRIPTION OF THE DRAWING

The novel features which are believed to be characteristic of this invention are set forth with particularity in the appended claims. The invention, itself, however, both as to its organization and method of operation, together with further objects and advantages thereof, may best be understood by reference to the following descriptions taken in connection with the accompanying drawings, wherein:

DETAILED DESCRIPTION OF THE INVENTION

Reference is now made to the drawings and wherein a fluids mixing and dispensing device embodying the principles of the invention is shown and designated at 10. The device 10 is designed, in the embodiment illustrated, to mix gasoline and lubricating oil in predetermined proportions and to dispense the mixture to a flexible conduit 11. Conduit 11 may be used for delivering the mixture to a suitable holding tank or to a point for the consumption of the fluid, such as to a two-cycle engine that is powered by the gasoline and lubricated by the oil component of the mixture.

The gasoline is received at the device through a flexible delivery tube or conduit, designated at 12. Conduit 12 is connected to a suitable source for the fluid. The lubricating oil, on the other hand, is delivered to the device through another flexible delivery tube or conduit 13 and which, of course, is also connected to a suitable source of this fluid.

Device 10 has a rigid body portion 15 that includes a solid cylindrical metal block 16 and a hollow cylindrical casing 17. These body components 16 and 17 are coaxially aligned in the assembled device and are secured together by means of screw type metal fasteners 18. To facilitate rigid attachment of the two body components, block 16 is equipped with a radially extending annular flange 19 at its upper end, and the lower end of the casing 17 is similarly provided with an outwardly projecting annular flange 20. Flanges 19 and 20 are engaged by metal fasteners 18 as seen in the drawings.

The assembled arrangement provides a chamber 21 in the upper end portion of the body for receiving and dispensing the gasoline. Chamber 21 houses a piston 22 that is arranged for linear reciprocating movement between its lower position 24 (FIG. 2) and its upper position 25 (FIG. 8) along the axis 23 of the body. The piston is cup shaped in the embodiment illustrated and its perimeter is radially inset from the cylindrical wall 26 of the chamber 21 so as to accommodate a conventional rolling type circular diaphragm 27 that serves to provide a fluid seal between the piston 22 and the fluid intake and discharge end of chamber 21. The diaphragm 27 is clamped between flanges 19 and 20 along its perimeter and is secured to the lower face of piston 22 in a conventional manner. As such, the center portion of diaphragm 27 is carried with the piston as it is driven between positions 24 and 25 during its fluid intake and discharge strokes that are directionally indicated by arrows 28 and 29 respectively.

In the embodiment illustrated, piston 22 is driven during its discharge stroke 29 by means of a coiled compression spring 30. Spring 30 is compressed between the upper face of the piston and the upper end wall 31 of the chamber. Spring 30 constantly exerts a force on the piston and which urges or biases it toward its lower position 24. At the upper end of chamber 21, the end wall 31 has a circular cutout 32 which is covered by a disk-type cap 33. Cap 33 is releasably fixed to the end wall by means of screw type fasteners 34. This arrangement provides a conveniently available accessway to the interior of chamber 21 for manipulation of a venting screw 45 which is used to bleed air from the oil chamber when the device is being set up for operation.

Piston 22 has a circular aperture which is coaxial with the body axis 23. Here the piston 22 is equipped with a hollow, elongated cylindrical member 40 which is fixed upright on the piston 22 and provided with an end opening 41 that opens downwardly through the piston aperture 36. Member 40 is fixed to and movable with piston 22 and provides a cylindrical chamber 42 for receiving and dispensing the lubricating oil and in which the fluid drive coupling is established for movement of piston 22 during its intake stroke 28.

Figure 7:
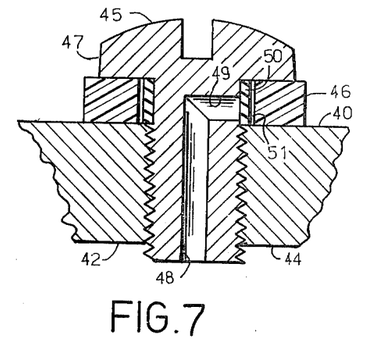
FIG. 7 is an elevational sectional view along the line 7—7 of FIG. 2.

Chamber 42 has a cylindrical side wall 43 and an upper end wall 44. The venting screw 45 and its relationship to the end wall 44 is best illustrated in FIG. 7 and where it will be seen that a flexible annular element 46 surrounds the shank of the screw 45 adjacent the screw head 47. Element 46 is clamped between the end wall 44 and screw head 47 when the screw 45 is fully seated in the threaded wall opening. The shank has an axial bore 48 that communicates with chamber 42 at its lower end and with a radially extending bore 49 at its upper end. The latter bore 49 opens to the screw exterior beneath the head 47, and here the venting screw 45 is provided with a small, snuggly fitting, annular elastic member 50 which covers the exterior opening for bore 49. The arrangement is such as to provide an annular space 51 between components 50 and 46.

When chamber 42 is being initially filled to prime the device for continuous operation, venting screw 45 is loosened while the oil in the chamber 42 is under a pressurized condition. This permits the head 47 to rise from its seat on element 46 and enables the elastic member 50 to be dislodged at the mouth of bore 49 so that residual air can be bled off from chamber 42. Once lubricating oil appears during this adjustment process, the venting screw 45 is, of course, tightened down to again hermetically seal chamber 42 across the upper end wall 44.

Figure 8:
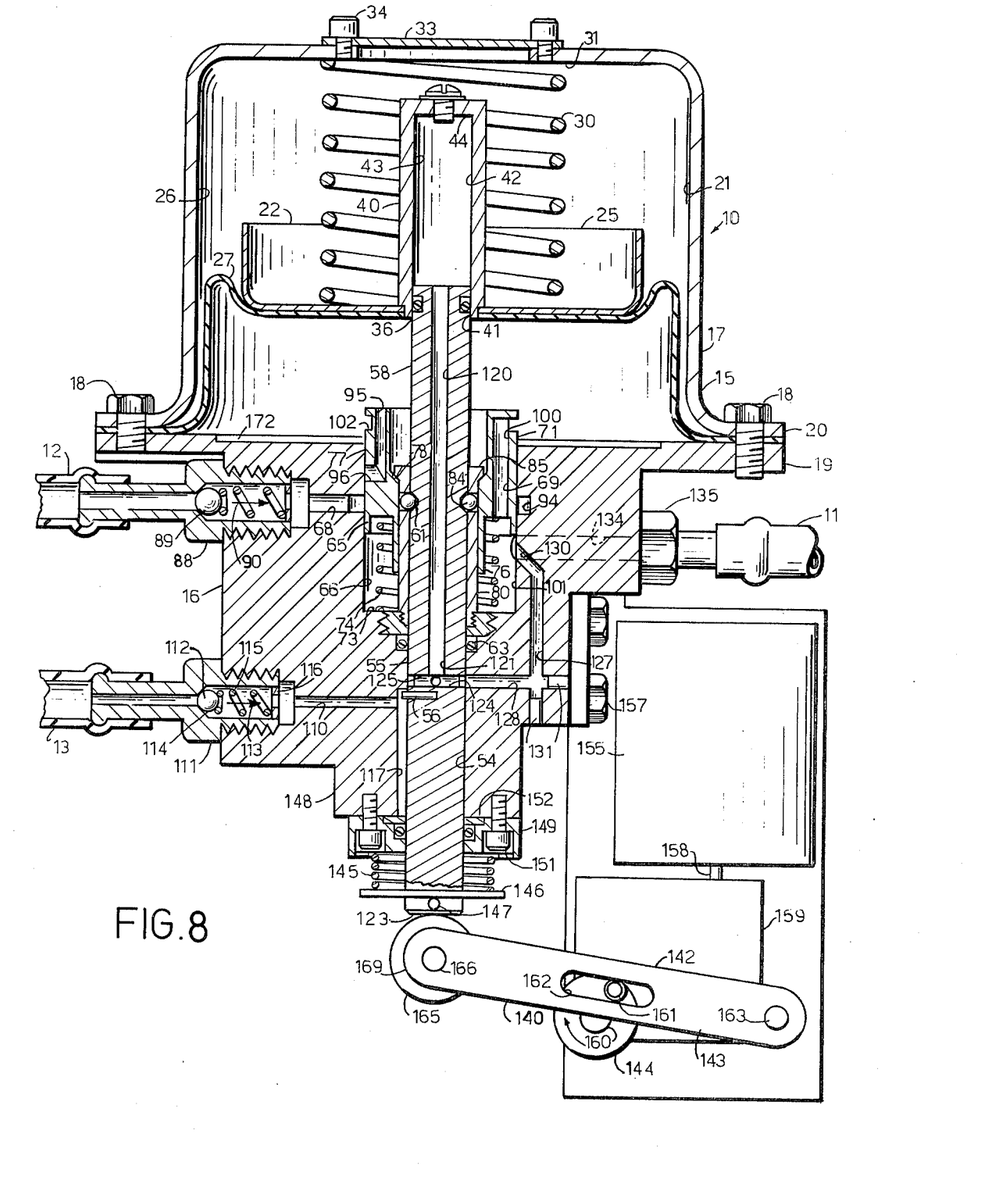
FIG. 8 is a vertical sectional view similar to FIG. 2 but illustrating certain parts in different positions.

The metal block 16 has a center bore 54 that is coaxial with the body axis 23. Here the body houses an elongated, reciprocatingly driven member or element 55. The upper end of the element 55 functions as a piston component in chamber 42 and serves to displace oil received in the chamber during the fluid discharge stroke 29 of piston 22. Member 55 is reciprocatingly driven and moves between a retracted position 57 (FIG. 2) and an extended position 58 (FIG. 8). It has an oil intake stroke, designated by arrow 59, during which lubricating oil is pumped into chamber 42. This establishes a fluid drive coupling in chamber 42 between the element 55 and piston 22 so that during the other stroke, designated by arrow 60, of element 55, piston 22 is driven to its upper position 25 as the element 55 moves to its extended position 58. At its upper end, element 55 is provided with an O-ring 62 that provides a seal in chamber 42, and generally intermediate the upper and lower ends of block 16 another O-ring type seal 63 is provided at the periphery of the reciprocating element.

At the upper end of block 16, bore 54 has a cylindrical enlargement 66 to accommodate an axially moveable cylindrical sleeve 65. Sleeve 65 functions as a valve during the operation of the device to open and close the intake and discharge passageways 68 and 69 for delivering the gasoline to and from chamber 21. Sleeve 65 is moveable between a retracted position 70 (FIG. 2) and an extended position 71 (FIG. 8) and it surrounds another cylindrical annular sleeve component 80. Sleeve 80 is threaded upright and fixed in the block 16 at the base of the cylindrical enlargement 66. At the base of this enlargement 66, sleeve 65 is equipped with a coiled compression spring 74 which surrounds sleeve 80 and is compressed between the valve sleeve 65 and the shoulder 73 which is formed at the base of the bore enlargement so that the valve sleeve 65 is constantly subjected to an upwardly directed biasing force that urges the sleeve toward its extended position 71.

The internal surface of sleeve 80 is aligned with the wall surface at the lower end of bore 54 and the sleeve, accordingly, serves, among other things, to guide the movements of the reciprocating member 55 in the enlargement area of the center bore 54. Sleeve 80 also provides a mounting place for components that are used to alternately lock the piston member 55 in its extended position 58 and the valve sleeve 65 in its retracted position 70.

Wall 81 of sleeve 80 has four holes 83 that are circumferentially spaced apart at the upper end of the sleeve. Each hole 83 contains a metal ball 84 that serves as a detent in carrying out the locking functions. In this respect, the piston member 55 has an annular groove 61 for reception of the balls when it reaches its extended position 58. The lower end 76 of valve sleeve 65 snuggly fits around the guide sleeve 80. As such, when the piston element 55 is at its extended position 58, the ball detents 84 are maintained in the groove 61 through contact with the lower end 76 of the valve sleeve.

The upper end 77 of valve sleeve 65 is radially offset from the guide sleeve 80. This facilitates the provision of an inclined annular shoulder 78 at the interior of the valve sleeve and which is engaged by the ball detents 84 in serving to lock the valve sleeve at its retracted position 70 against the urgings of spring 74. Under such circumstances, balls 84 are maintained in engagement with the shoulder 78 through contact with the surface of piston member 55.

Operationally, and assuming the valve sleeve 65 is in its retracted position 70, as the piston member 55 reaches its extended position 58, groove 61 comes into working alignment with the holes 83 for the ball detents 84. As this happens, spring 74 urges the sleeve 65 upwardly and, through the inclined shoulder arrangement, it thrusts the ball detents 84 into the groove 61 to automatically release the valve sleeve and lock the element 55 at its extended position. As this transpires, spring 74 forces the sleeve to its extended position 71. At this position 71, the shoulder 78 encounters a radial flange 85 on the fixed guide sleeve 80 and which serves to limit upward movement of the member. Piston member 55 is at all times under a downward biasing force as will be subsequently seen. As such, as the valve member 65 is forced downward and back into its retracted position 70, the downward force on member 55 automatically forces the balls 84 out of the groove 61 to release the member 55 and into locking engagement with the shoulder 78 of the sleeve 65. As this happens, the piston member 55 continues to move downwardly to its retracted position and maintain the balls 84 in the shoulder engaging position shown in FIG. 2.

The gasoline intake passageway 68 is equipped with an adapter 88 to facilitate connection with the delivery tube 12. Adapter 88 is threadingly engaged in block 16 and it has a check valve 89 that limits flow in the passageway to the direction indicated by arrow 90. Valve 89 is of the ball and compression spring type with the ball 91 being biased or urged against the valve seat by a coiled spring 92 that is compressed between the ball 91 and a small inwardly directed annular flange 93 at the outlet end of the adapter.

Figure 3:
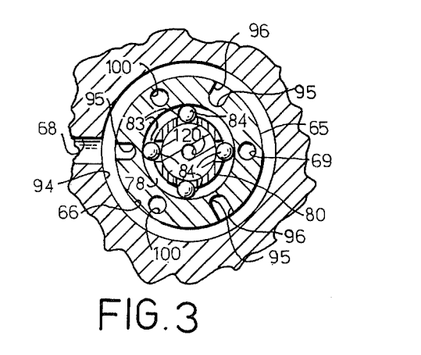
FIG. 3 is a horizontal sectional view of a fragment of the device as seen along the line 3—3 of FIG. 2.
Figure 5:
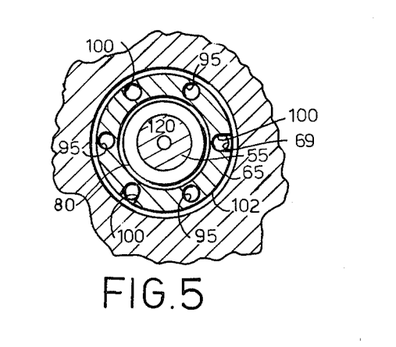
FIG. 5 is another horizontal sectional view showing a fragment of the device as seen along the line 5—5 of FIG. 2.
Figure 6:
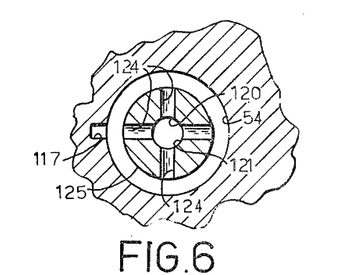
FIG. 6 is a sectional view illustrating a fragment of the device along the line 6—6 of FIG. 2.

The intake passageway 68 communicates with the bore enlargement 66 at an annular groove 94 in the wall of the enlargement 66. Groove 94 confronts the outer wall surface of the valve sleeve 65, as seen in the drawings. Valve sleeve 65 has three circumferentially spaced, vertical bores 95 (FIGS. 3 and 5) which communicate with the gasoline chamber 21 at the upper end of valve sleeve 65. These bores 95 are provided at their lower ends with radial extensions 96 that communicate with the annular groove 94 when the sleeve 65 is in the retracted position 70. These extensions 96, on the other hand, confront the side wall of the bore enlargement when the valve sleeve 65 is in its extended position 71 so that, under such circumstances, the intake passageway 68 is closed and disconnected from the chamber 21.

The discharge passageway 69 for chamber 21 is located in the valve sleeve 65 in the embodiment illustrated. It is formed by three vertical bores 100 (FIGS. 3 and 5) that are circumferentially spaced apart and communicate with the housing area for spring 74, at the base of the enlargement. This housing area additionally serves as the mixing chamber 101 in which the fluids displaced in the chambers are mixed. The vertical bores 100 communicate laterally at the upper end of the valve sleeve with an annular groove 102 in the outer wall of the sleeve. Groove 102 communicates with chamber 21 when the valve sleeve 65 is in the extended position 71 so as to interconnect the piston chamber 21 and mixing chamber 101. On the other hand, groove 102 confronts the bore side wall when the valve sleeve 65 is in the retracted position 70 to thus close the discharge passageway 69.

The intake passageway for the lubricating oil is designated at 110. At the perimeter of the block 16, the passageway 110 is equipped with another adapter 111 which facilitates connection with the delivery tube 13. Adapter 111 is also equipped with a ball and spring type check valve 112 that serves to limit the fluid flow in the passageway to the direction indicated by arrow 113. Adapter 111 is similarly threadingly engaged in the metal block 16. The check valve 112 has a ball 114 that operates against the valve seat and the ball is biased against the seat by a compression spring 115 that is compressed between the ball 114 and an annular flange 116 at the outlet end of the adapter. The intake passageway 110 for receiving the oil from the oil source communicates with the center bore 54 along a vertical slot 117 in the bore side wall. Element 55 carries a pin 56 that is press fit in a radial bore in the element. Pin 56 projects outwardly into the slot 117 and is arranged to encounter the body at the upper and lower ends of the slot 117 to limit movements of the element and determine the extended and retracted positions 58 and 57.

The reciprocating member 55 has a passageway 120 for delivering the oil to and from the chamber 42. Passageway 120 is formed by an axially extending bore 121 which communicates at its upper end 122 with chamber 42 during the reciprocating movements of the member 55. The lower end of the bore 121 is offset from the lower end 123 of member 55 and it communicates with four circumferentially spaced and radially extending bores 124 which in turn communicate with an annular slot 125 in the peripheral wall of member 55. The piston chamber 42 is accordingly connected to the oil intake passageway 110 when slot 125 confronts the vertical groove 117 in the bore side wall.

The discharge passageway for receiving the lubricating oil displaced by the element 55 in chamber 42 is designated at 127. It includes a horizontal bore 128 which communicates with a vertical bore 129 in the block. Bore 129 is provided with an inclined extension 130 that communicates with the bore enlargement 66 through the bore side wall. Bores 128 and 129 contain end plugs 131 at their exterior ends in the block 16. Bore 128 communicates with the lower end of center bore 54 and is so arranged that the discharge passageway 127 is connected to the chamber 42 when element 55 is at its extended position 58.

Figure 4:
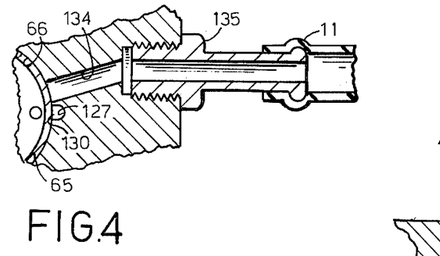
FIG. 4 is another horizontal sectional view showing a fragment of the device along the line 4—4 of FIG. 2.

The outlet passageway for the fluid mixture is designated at 134. It communicates with the enlargement 66 through the bore side wall and at a location which is adjacent to the bore extension 130 for the oil discharge passageway (FIG. 4). At the perimeter of the block 16, the mixed fluids outlet passageway 134 is equipped with an adapter 135 that is screwed in the block 16 for purposes of coupling the flexible conduit 11 to the passageway 134 for reception of the fluid mixture. Passageways 127 and 134 are so arranged to communicate with the bore enlargement 66 that the valve sleeve 65 covers the passages when the valve sleeve is retracted but permits communication with the mixing chamber when the valve sleeve moves to its extended position 71. Hence, the action of the valve sleeve 65 is such as to also open and close the passageways 127 and 134 in accord with the valve sleeve movements.

The mechanism for reciprocatingly driving the piston member 55 is designated at 140. It includes a cam mechanism 142 with a pivot arm 143 that is driven by a crank 144 which has a predetermined period of cyclic movement. Mechanism 142 is designed to drive the elongated piston member 55 to its extended position 58, but on the return stroke 59, member 55 is driven by a compression spring 145.

The lower end 123 of member 55 is equipped with a washer 146 that is retained on the element by a radially projecting pin 147. The block 16 has a boss 148 at its lower end, and here the body is equipped with an annular fitting 149 that surrounds the member 55. Fitting 149 houses an O-ring 150 that serves to provide a fluid seal at the lower end of the body. Fitting 149 is attached to the boss 148 by metal fasteners 151 and it also houses an annular metal plate 152 that is engaged by the pin in slot 117 in limiting the movement of the element 55 into its retracted position. The spring 145 for driving the member 55 during its return stroke 59 is coiled about the lower end of the member and is compressed between the washer 146 and the annular fitting 149 so that member 55 is constantly subjected to a biasing force that tends to return it to its retracted position 57.

Figure 1:
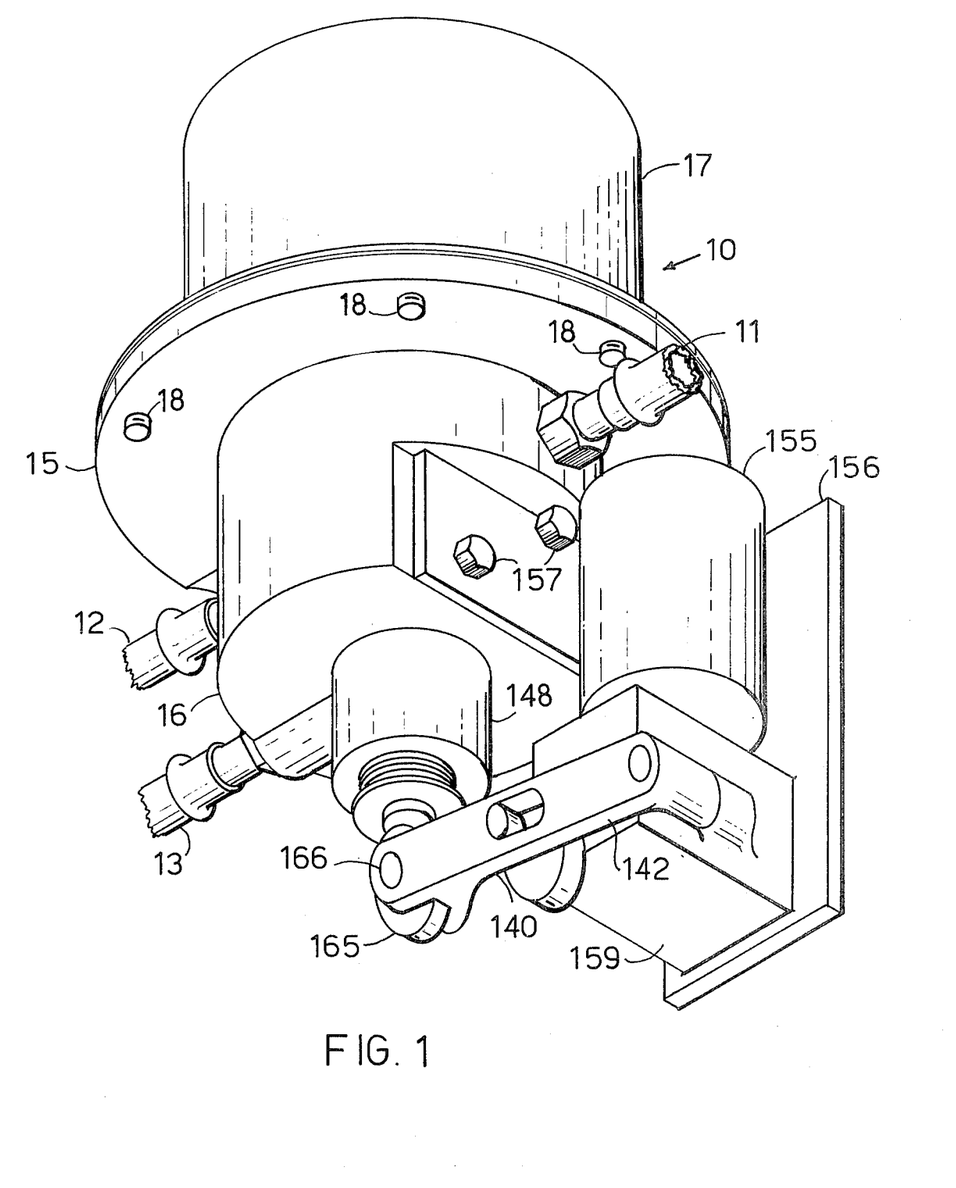
FIG. 1 is an isometric view of a mixing and dispensing device embodying the principles of the invention.

The cam mechanism 142 is driven by an electric motor 155 which is mounted on a bracket 156. Bracket 156 is fixed to a flat on the side wall of the block 16 by means of metal fasteners 157. The output shaft 158 of motor 155 is drivingly connected to a reduction gear mechanism that is housed in the gear box which is also mounted on the bracket. The output shaft 160 of the gear mechanism carries a crank 144, and the latter has a pin 161 that engages the pivot arm 143 in an appropriate slot 162. The piston arm 143 is mounted for pivotal movement about a pivot pin 163 that is mounted on a boss component of the gear box 159 (FIG. 1). The working end of the pivot arm 143 is bifurcated and it carries a wheel 165 that is rotatably mounted on a pin 166 and arranged to oscillate in working alignment with the lower end of the element 55.

The crank 144 is rotatably driven at an rpm which is predetermined and with each revolution carries the pivot arm 143 from its lower position 168 (FIG. 2) to its upper position 169 (FIG. 8) and then back again to its lower position 168 during each cycle. The end wheel 165 is arranged in working alignment with the lower end 123 of element 55 during the oscillating movement of arm 143. As the arm 143 oscillates and moves from its lower position 168 to its upper position 169, the wheel 165 engages the element end 123 and drives the piston member 55 to its extended position 58. At its extended position 58, the member 55 becomes locked until such time as the fluids in chambers 42 and 21 are displaced. As this is happening, cam mechanism 142 continues its cyclic operation so that the pivot arm disengages the locked element 55 and returns to its lower position 168. In the event the fluids discharging action in chambers 21 and 42 and the return action of spring 145 on member 55 exceeds the time required for pivot arm 143 to move from its upper position 169 to its lower position 168, arm 143 will engage the piston end 123 during its oil intake stroke 59 and then again proceed to drive the member 55 to its extended position 58. This, of course, limits the oil intake during the cycle but it also limits the gasoline intake proportionally since the excursion for piston 22 towards its upper position 55 is proportionally reduced.

Figure 2:
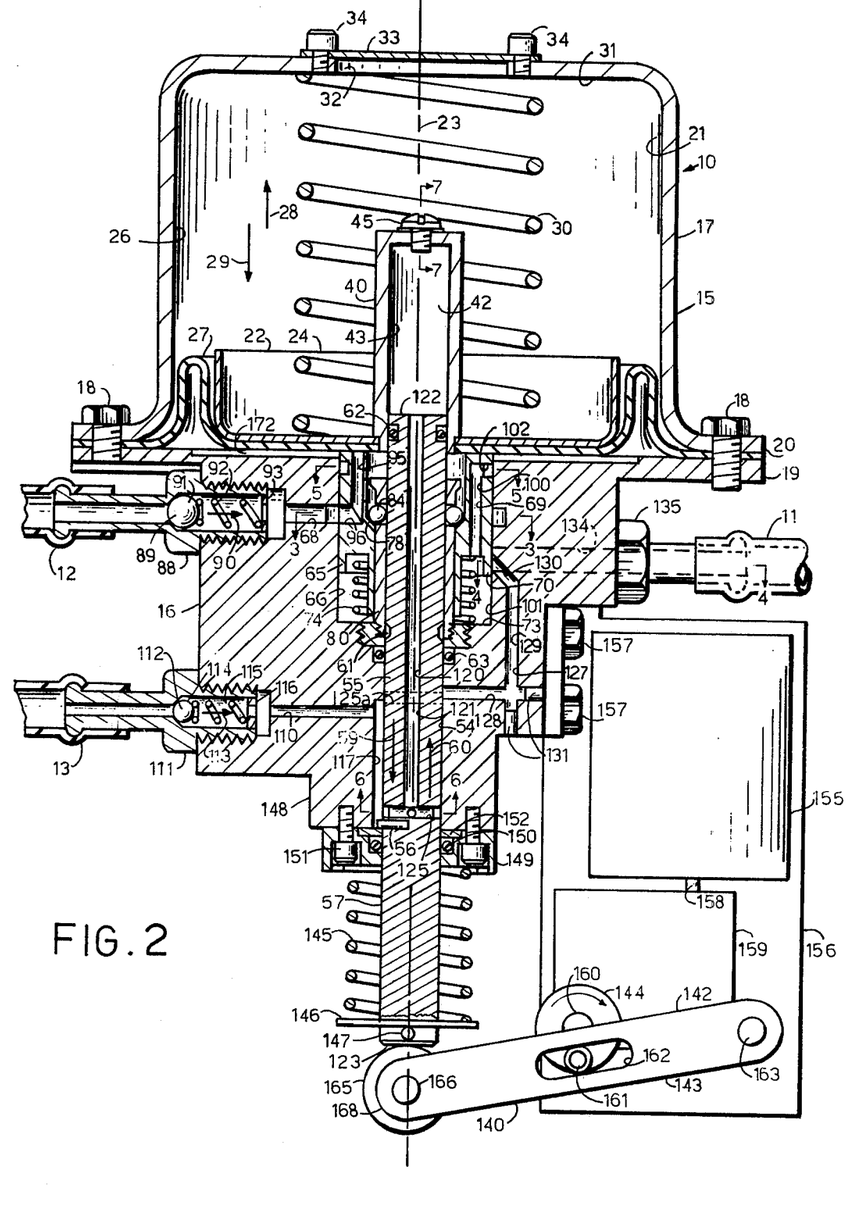
FIG. 2 is a sectional view taken generally along the center axis through the body of the device and with certain components of the drive mechanism seen in side elevation.

The operation of the device 10 is best illustrated by the movements depicted in FIGS. 2, 8, 9 and 10. FIG. 2 depicts the arrangement of the moveable parts at the commencement of a full intake stroke for the piston 22 in chamber 21. Under such circumstances, element 55 commences its gasoline intake stroke 60 from its fully retracted position 57 and the pivot arm 143 commences its cyclic operation at its lower position 168. Under such circumstances, both the pivot arm 143 and element 55 are assumed to have reached these positions simultaneously. Under such circumstances, piston 22 is at its lower position 24 and valve sleeve 65 is locked in its retracted position 70.

This arrangement of the sleeve 65 at its retracted position 70 serves to close the gasoline discharge passageway 69 so that the mixing chamber 101 and gasoline chamber 21 are disconnected. The sleeve 65 arrangement also serves to close the oil discharge passageway 127 so that the mixing chamber 101 and oil chamber 42 are also disconnected. The arrangement also serves to close the mixed fluids outlet passageway 134 but, on the other hand, is such that the gasoline intake passageway 68 is open and connected to chamber 21 through the bores in the valve sleeve.

With the components in the positions shown in FIG. 2, chamber 42 communicates with the oil intake passageway 110 via the piston passageway 120 and it can be assumed that chamber 42 is full of oil since the element 55 has just completed its oil intake stroke 59. As such, as the crank 144 rotates and starts to drive the piston arm 143 towards its upper position 169 (FIG. 8), element 55 is engaged by wheel 165 and driven towards its extended position 58. As this happens, the oil in chamber 42 becomes trapped because of the action of check valve 112, even though the oil intake passageway 110 is connected to chamber 42. As such, there is a fluid drive coupling which is established in chamber 42 between element 55 and piston 22 such that during the gasoline intake stroke 60 of element 55, piston 22 is driven in the direction of arrow 28 towards its upward position 25 and thus serves to draw gasoline into the chamber through passageway 68. Spring 30 is, of course, compressed during this intake stroke movement 28 of piston 22.

As element 55 is about to assume its extended position 58, the annular slot 125 at the lower end of passageway 120 starts to communicate with the oil discharge passageway 127, as indicated at 125A in FIG. 2. As this happens, the slot 125 remains in partial communication with the vertical slot 117 of oil intake passageway 110 so that the oil intake and discharge passageways 110 and 120 are momentarily interconnected through the lower end of passageway 120, as element 55 enters and leaves its extended position 58.

As member 55 enters its extended position 58, the oil intake passageway 110 and chamber 42 are fully disconnected and the chamber 42 is fully connected to the discharge passageway 127. As this happens, the groove 61 in element 55 becomes aligned with the fixed sleeve holes housing the detent balls 84, and the upward thrust of the compression spring 74 on the valve sleeve 65 forces the balls 84 into the groove 61 to thereby lock the element 55 at its extended position 58.

As the balls 84 move into groove 61 to lock element 55 in its extended position 58 the ball detents release the valve sleeve and spring 74 thereupon carries the valve sleeve 65 to its extended position 71. As this transpires, chamber 21 is disconnected from the gasoline intake passageway 68 and is connected to the discharge passageway 69 so that the mixing chamber 101 and chamber 21 are thereby interconnected through the passageway 69 in sleeve 65. Simultaneously the movement of the valve sleeve 65 into its extended position connects the oil discharge passageway 127 and mixing chamber 101 and also interconnects the outlet passageway 134 and the mixing chamber 101.

The movement of valve sleeve 65 to its extended position 71 basically connects both of the chambers 21 and 42 to the outlet passageway 134. This connection breaks the fluid drive coupling in chamber 42 and permits the compression spring 30 to force the piston 55 in the direction of arrow 29 to commence the fluid discharge stroke. As this happens, and piston 22 moves toward its lower position 24, the fluid in chamber 21 is displaced by the piston 22 and forced out the discharge passageway 69 to the mixing chamber 101 and from whence the mixed fluids pass through outlet passageway 134. Simultaneously with the piston 22 movement during the discharge stroke, chamber 42 moves relative to the upper end of element 55 so that the latter element 55 serves to displace the oil in chamber 42. This displaced oil passes out of the chamber 42 through the piston passageway 120 and via discharge passageway 127 to the mixing chamber 101 and from whence it discharges through outlet passageway 134.

Figure 9:
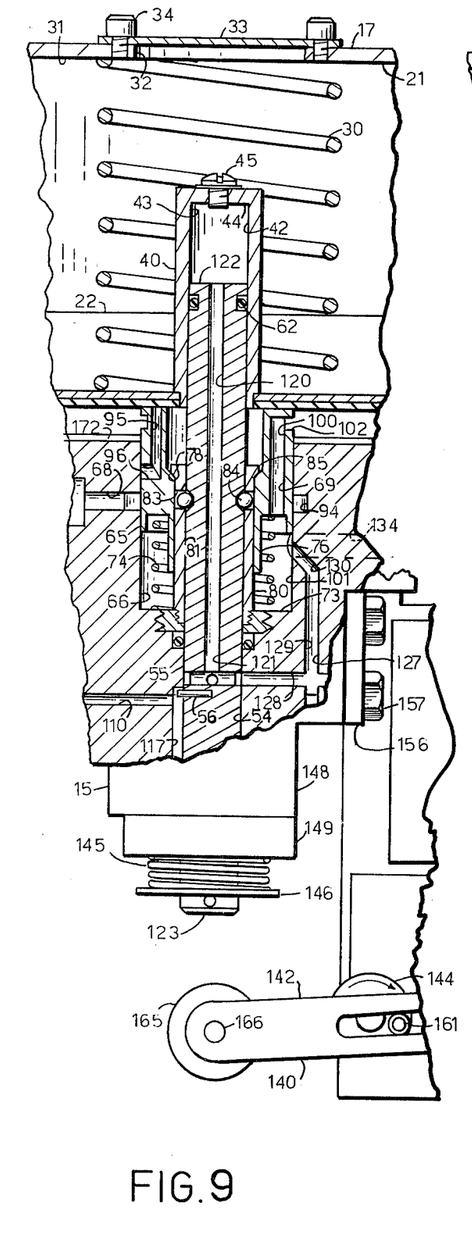
FIGS. 9 and 10 show fragments of the device with certain parts broken away to illustrate different positions for components seen in FIGS. 2 and 8.

As seen in FIG. 9, during the discharge stroke 29, the valve sleeve 65 is encountered by the diaphragm along the lower face of the piston 22 and is forced downwardly under the influence of spring 30 and against the urgings of spring 74 to its retracted position 70. As the valve sleeve 65 moves into its retracted position 70, chamber 21 is disconnected from the mixing chamber 101 and is again connected to the intake passageway 68. Simultaneously, the outlet passageway 134 and discharge passageway 127 become closed by the sleeve and thus disconnected from the mixing chamber 101.

As the valve sleeve moves into its retracted position 70 under the action of spring 30 against piston 22, the inclined shoulder 78 aligns itself with the ball detents 84. As this happens, the action of spring 145 at the lower end of element 55 is such as to urge the element 55 downwardly to commence the oil intake stroke 59 and the detents 84 are thereby forced out of groove 61 and into valve sleeve 65 locking engagement with the sleeve shoulders 78.

Figure 10:
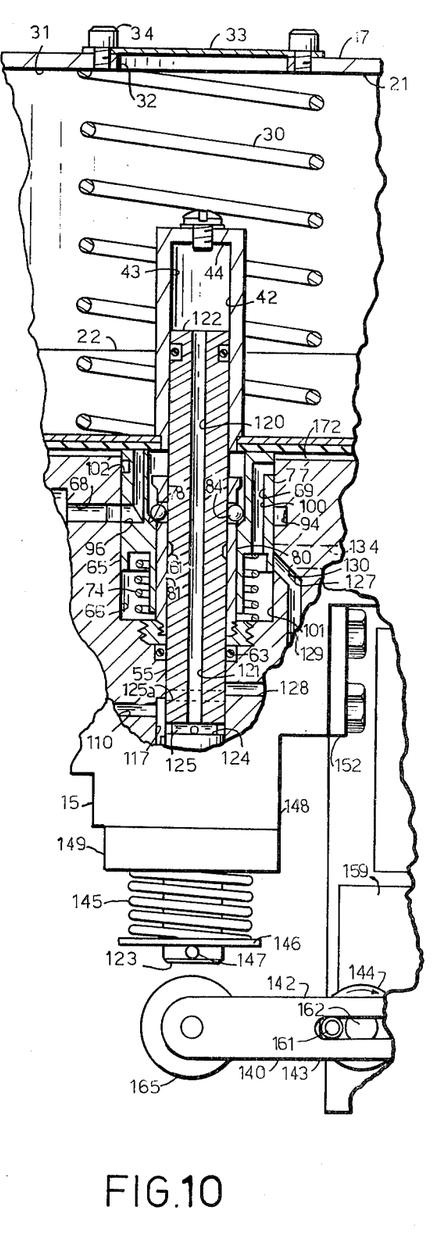

As seen in FIG. 10, as the element 55 moves out of its extended position 58 towards its retracted position 57 after being released from locking engagement with the ball detents 84, the groove 125 assumes a position 125A before the chamber is fully disconnected from passageway 127 and at which the oil chamber 42 is momentarily connected with both of the oil intake and discharge passageways 110 and 127. Since the discharge passageway 127 is at this point cut off from the mixing chamber 101 because of the valve position 70, a momentary slight vacuum is created in chamber 42 before the slot 125 in passageway 120 confronts groove 117 of the intake passageway 110. This slight vacuum tends to draw piston 22 downwardly further than the lower position 24 depicted in FIG. 2. The upper face 171 of the block has a slight recess 172 that permits the slight downward movement of piston 22. This slight downward movement of piston 22 also moves the valve sleeve 65 slightly downwardly against spring 74 until the groove 125 confronts the passageway groove 117 to break the slight vacuum in chamber 42. The downward movement of piston 22 below the lower position 24 depicted in FIG. 2 under the influence of the slight vacuum created in chamber 42 causes a slight compression in the residual fluid that remains in the roll of the diaphragm but is permitted because of the flexible nature of the diaphragm. Once the groove 125 confronts the passageway 117 to commence the oil intake stroke 59 for the element 55 check valve 112 opens and permits the oil to pass into the intake passageway and where it is thereafter drawn through the piston passageway 120 and into the chamber 42 thereafter during the intake stroke 59 of element 55.

FIG. 10 illustrates the situation where the pivot arm 143 has completed its cycle of movement from and to its lower position 168 and is now moving towards its upper position 169 before element 55 has reached its fully retracted position 57. Under such circumstances, the wheel 165 on arm 143 will contact the lower end of element 55 before it reaches its fully retracted position 57 and will thereupon drive the element 55 to its fully extended position 58 and, simultaneously carry the piston on its fluid intake stroke to a position intermediate the positions 24 and 25. During this upward movement of piston 22 the piston will draw in a quantity of gasoline that will be proportionate to the amount of oil trapped in chamber 42 at the time of contact with the pivot arm wheel 165.

The embodiment illustrated has special utility when used to porportion and dispense gasoline and oil mixtures to engines that rely on the oil component for lubrication. When the feed source of oil becomes exhausted, the device automatically ceases to dispense the gasoline for it is evident that without establishment of the fluid coupling, the gasoline displacing piston is incapable of operating to dispense the gasoline.

As will be evident from the foregoing, the cam drive arrangement for the reciprocating member 55 provides a simple and effective drive arrangement that permits the member to be locked in the fixed position and thereafter released during its cyclic operation and without the need for the more expensive clutching arrangements that are required when the element is directly coupled to the power source. Yet another feature of the invention resides in the means provided for delivering the drive coupling fluid to and from the chamber and without the need for the more complicated valving mechanisms shown in the inventor's prior patent.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. In a device for mixing and dispensing fluids in predetermined proportions that has a first chamber for receiving and dispensing a first fluid, a second chamber for receiving and dispensing a second fluid, an element for displacing second fluid received in the second chamber and which is reciprocatingly driven between predetermined positions, and a piston for displacing first fluid received in the first chamber and which has fluid intake and discharge strokes and is driven during one of said strokes through a fluid drive coupling that is established with the element in said second chamber, the improvement wherein said element has a passageway for delivering the second fluid to and from said second chamber and which communicates with the second chamber during movements of the element between said predetermined positions.

2. The device in accord with claim 1 wherein said device has an intake passageway for receiving the second fluid from a source thereof, and a discharge passageway for receiving second fluid displaced in the second chamber by said element, wherein said element moves with respect to said intake and discharge passageways during its movements between said predetermined positions, said element passageway being arranged to connect and disconnect the second chamber and the discharge passageway during respective movements of the element into and out of one of said predetermined positions and being further arranged to disconnect and connect the second chamber and the intake passageway during respective movements of the element into and out of said one of said predetermined positions.

3. The device in accord with claim 2 wherein the element passageway is arranged to communicate with both of the intake and discharge passageways during the movements of the element into and out of said one of said predetermined positions.

4. In a device for mixing and dispensing fluids in predetermined proportions that has a first chamber for receiving and dispensing a first fluid, a second chamber for receiving and dispensing a second fluid, an element for displacing second fluid received in the second chamber and which is recriprocatingly driven between predetermined positions, and a piston for displacing first fluid received in the first chamber and which has fluid intake and discharge strokes and is driven during one of said strokes through a fluid drive coupling that is established with the element in said second chamber, the improvement comprising a valve member having a discharge passageway for receiving first fluid displaced in the first chamber by said piston, said valve member being movable between first and second positions at which said discharge passageway is respectively connected to and disconnected from said first chamber, means locking said valve member at said second position, and means biasing the valve member toward its first position, said locking means being automatically responsive to movement of said element into one of its predetermined positions to release said valve member and lock said element at said one of its predetermined positions.

5. The device in accord with claim 4 comprising an intake passageway for receiving the first fluid from a source thereof, and wherein said intake passageway is connected to and disconnected from said first chamber at said second and first valve positions respectively.

6. The device in accord with claim 4 comprising a fluids mixing chamber having a mixed fluids outlet passageway, wherein said discharge passageway communicates with said mixing chamber, and wherein said valve member is arranged to close and open said outlet passageway at said first and second valve positions respectively.

7. The device in accord with claim 4 where said valve member is an annular member and said element extends through said annular member.

8. In a device for mixing and dispensing fluids in predetermined proportions that has a first chamber for receiving and dispensing a first fluid, a second chamber for receiving and dispensing a second fluid, means that serves to displace second fluid received in the second chamber and which is reciprocatingly driven between predetermined positions, and piston means for displacing first fluid received in the first chamber and which has fluid intake and discharge strokes and is driven during one of said strokes through a fluid drive coupling that is established with the second fluid displacing means, the improvement comprising a mechanism for reciprocatingly driving the second fluid displacing means, said second fluid displacing means having passageway means for delivering the second fluid to and from said second chamber during its movements between said predetermined positions, and a valve member having a discharge passageway for receiving first fluid displaced in the first chamber by said piston, said valve member being movable between first and second positions at which said discharge passageway is respectively connected to and disconnected from said first chamber, means locking said valve member at said second position, means biasing the valve member toward its first position, said locking means being automatically responsive to movement of said second fluid displacing means into one of its predetermined positions to release said valve member and lock said second fluid displacing means at said one of its predetermined positions, and said mechanism including means biasing the second fluid displacing means toward the other of its predetermined positions, and driven cam means having a predetermined period of cyclic movement for driving the second fluid displacing means toward said one of its predetermined positions.

* * * * *